United States Patent
Andenæs

(10) Patent No.: US 7,043,200 B2
(45) Date of Patent: *May 9, 2006

(54) SATELLITE UPLINK POWER CONTROL

(75) Inventor: Jens Andenæs, London (GB)

(73) Assignee: Telenor ASA, Fornebu (NO)

( * ) Notice: Subject to any disclaimer, the term of this patent is extended or adjusted under 35 U.S.C. 154(b) by 463 days.

This patent is subject to a terminal disclaimer.

(21) Appl. No.: 10/162,888

(22) Filed: Jun. 6, 2002

(65) Prior Publication Data

US 2003/0008615 A1 Jan. 9, 2003

Related U.S. Application Data

(60) Provisional application No. 60/300,821, filed on Jun. 27, 2001.

(30) Foreign Application Priority Data

Jun. 6, 2001 (NO) .......................................... 20012776

(51) Int. Cl.
*H04B 7/185* (2006.01)

(52) U.S. Cl. .................... 455/13.4; 455/522; 455/67.11; 455/427; 455/3.02; 455/12.1

(58) Field of Classification Search ................ 455/13.4, 455/522, 69, 67.11, 430, 12.1, 427, 3.02, 455/67

See application file for complete search history.

(56) References Cited

U.S. PATENT DOCUMENTS

| 4,567,485 | A |   | 1/1986  | Oshima et al. |        |
|-----------|---|---|---------|---------------|--------|
| 4,697,187 | A | * | 9/1987  | Ohno et al. ................. | 342/358 |
| 4,752,967 | A |   | 6/1988  | Bustamante et al. |    |
| 4,896,369 | A | * | 1/1990  | Adams et al. ............. | 455/13.4 |
| 4,965,809 | A | * | 10/1990 | Endo ........................... | 375/260 |
| 5,835,847 | A | * | 11/1998 | Gilmore et al. ............ | 455/12.1 |
| 6,088,573 | A | * | 7/2000  | Tsuda ......................... | 455/13.4 |
| 6,236,361 | B1 | * | 5/2001 | Rosen ........................ | 342/359 |
| 6,240,124 | B1 | * | 5/2001 | Wiedeman et al. ......... | 375/130 |
| 6,400,927 | B1 | * | 6/2002 | Daniel et al. .............. | 455/13.1 |

* cited by examiner

*Primary Examiner*—Nick Corsaro
*Assistant Examiner*—Shaima Q Aminzay
(74) *Attorney, Agent, or Firm*—Young & Thompson

(57) ABSTRACT

A method and system for Uplink Power Control in a satellite communication system comprising a geostationary satellite (2) communicating with a gateway station (3) applying the invention and at least two other gateway station (4) is described. The invention utilizes the existing communication signals in the satellite communication system to compensate for atmospheric distortion as scintillation and rain fading effects. The method is symmetric with regard to which gateway that utilizes the invention in a communication system thereby increasing the regulation of all communication signals in the system.

16 Claims, 11 Drawing Sheets

SATELLITE UPLINK POWER CONTROL

FIELD OF THE INVENTION

The present invention pertains to the field of satellite communication and in particular to scintillation resistant power control techniques for geostationary satellite communication systems in accordance with claims 1, 8, 15 and 16, respectively.

BACKGROUND OF THE INVENTION

A satellite communication system generally comprises one or more gateway stations, a satellite and a number of user stations. The gateway stations provides an interface to the terrestrial networks and are transmitting and receiving communication carriers at high frequencies to and from the satellite. The satellite is functioning as an amplifier and/or frequency converter for the communication carriers. The user stations may be fixed or mobile. In systems comprising a small number of large gateway stations serving a large population of small user stations (fixed or mobile), satellite cost is normally governed by the characteristics of the forward transmission link, i.e. from the gateways to the user stations. This stems from the requirement to use small antennas on the user stations for cost reasons, which in turn requires more satellite power to achieve a particular transmission quality. This requires high power efficiency in the forward link to achieve good system economy.

The communication carriers are exposed to a number of effects that influence the signal quality or the signal level along the path from a gateway to the user station.

The most important elements are:

Variations in transmitter gain leading to variations in output power towards the satellite.

Uplink atmospheric effects such as rain fading and scintillation leading to large signal variations.

Variations in the satellite transponder signal gain.

Downlink atmospheric effects such as rain fading and scintillation.

The severity of these effects varies with the climatic conditions at the ground stations and their operating carrier frequency. The atmospheric effects are increased for ground earth stations (gateways or user stations) located such that the satellite is seen at a shallow angle above the horizon since the length of the atmospheric path increases with lower elevation angles.

All these contributions adds to a significant variation in the received signal level on the ground which in turn leads to the need of transmitting signals with an excessive margin to ensure a minimum guaranteed quality level. This margin detracts power from the satellite reducing the system capacity and thus the economics of the system as a whole.

PRIOR ART

Uplink power control systems has been described in several patents proposing various mechanisms to maintain constant transmit power from the satellite in satellite communications systems irrespective of atmospheric and other disturbances at the uplink station. Most applications are concerned with and designed to compensate relatively slow variations in the transmission path such as rain fading which have time constants of the order of minutes.

U.S. Pat. No. 4,567,485 describes a system where one of the stations in a satellite network is stabilized by using a satellite generated beacon signal as level reference in a power control loop. This station is then used as a level reference for the other stations in the network that are slaved to the first station. The system relies on a satellite beacon for its mode of operation, which may not be available at a frequency sufficiently close to the frequency band of the signals to be stabilized. For example, a normal satellite beacon around 3.9 GHz will not be effective in a mobile satellite communication system with its communication carriers around 1.5 GHz.

U.S. Pat. No. 4,752,967 describes various methods to compensate variations in the uplink transmission path of a satellite earth station utilizing signals from one or two other stations in the network as beacon stations in the process. In this proposal, rather than stabilizing one particular master station as described U.S. Pat. No. 4,567,485, one or two stations in locations with favorable atmospheric conditions are chosen as references for the power control system. Although the proposed methods will compensate slow varying atmospheric variations quite efficiently, they all have some shortcomings:

the beacon station(s) must exist with substantially less atmospheric variations than the station to be stabilized;

in any of the methods described either satellite variations, local station transmitter variations or both remain un-compensated;

atmospheric uplink variations at the beacon stations are transferred either 100% or 50/50 from each beacon station to the local station;

short term transmitter variations and/or long term variations of the beacon stations are transferred either 100% or 50/50 from each beacon station to the local station;

SUMMARY OF THE INVENTION

The objective of this invention is to combat not only the slow varying rain fading but also to be able to compensate rapid scintillation effects which occur especially to Satellite Earth Stations that see the satellite at a low elevation angle. These variations are caused by fluctuations in the ionosphere and can cause significant signal fluctuations over a period of a few seconds so schemes relying on heavy low-pass filtering to remove induced errors from external reference carriers (typically 10 seconds or more) will not be able to compensate such variations.

Scintillation also exhibits strong frequency dependency rendering compensation schemes utilizing beacon signals in a different frequency band to the carriers to be stabilized inefficient.

The present invention, in its preferred embodiments, addresses all the shortcomings in the prior art described above. This is accomplished by:

using a larger number of beacon stations, typically 3–5, to estimate local downlink conditions reducing the reliance on the individual beacon station characteristic;

superior method to estimate local down-link variations using adaptive weights to the beacon signals determined by their current individual behavior.

Implementing specific mechanisms for instantaneous detection and subsequent suppression of erroneous or abnormal beacon signals.

Inclusion of a local RF reference in the control loop to enable simultaneous suppression of all unwanted effects in the transmission path without introducing sensitivity to other unwanted detrimental effects.

The variations imposed on the received signal power level along the signal path is given by the equation:

$$\Delta Prx_{US} = \Delta TX_{Gw} + \Delta Up_{Gw} + \Delta Sat + \Delta Dwn_{Gw} \text{ where}$$

$\Delta TXG_w$ is the variations in transmitter gain leading to variations in output power towards the satellite. $\Delta UP_{GW}$ is the uplink atmospheric effects such as rain fading and scintillations leading to large signal variations. $\Delta Sat$ is the variations in the satellite transponder signal gain. $\Delta Dwn_{Gw}$ is the downlink atmospheric effects such as rain fading and scintillation.

The variations of these signal levels can be observed and measured by observing deviations from nominal level values of the different parameters. Parameters associated with equipment will have their nominal level values determined by the nominal settings of the controlling parameters of the equipment as known to a person skilled in the art. Parameters associated with atmospheric conditions will usually have their nominal parameters determined on a day with a clear sky minimizing distortions to the signal quality.

The objective of the present invention is to minimize these effects on the signal quality of the communication system and give the communication system the same quality as observed on a day with a clear sky.

A common method used in many systems is the use of Uplink Power Control (UPC) to maintain constant signal power out of the satellite in order to maximize system efficiency. The basic principle is to equip the gateway with a measurement receiver capable of measuring the received level of its own carrier (or a pilot carrier) looped back from the satellite. This information is used to adjust the transmitted level in the opposite sense to eliminate variations in the signal level when it is received on the ground.

In order to minimize satellite power and intersystem interference, it is desirable to maintain the communication carriers at a predefined constant level at the satellite output independent of the variations in the transmission path. This is accomplished by compensating for transmitter, uplink and satellite effects. The signal level information derived from the receiver at the gateway also includes downlink effects and signal detector (receiver) variations. Simple systems use empirical information to apportion a fixed amount of the total measured variations to uplink and satellite effects. In practice the following effects restricts the usefulness of this scheme and makes it unsuitable for many systems:

The ratio between uplink effects and downlink effects is not constant, but may vary considerably.

Receiver gain variations can introduce significant errors in the power regulation accuracy.

Uplink and downlink scintillations are not coherent if the uplink and downlink frequencies are significantly different leading to little or no improvement during scintillation events.

Substantial improvements can be achieved if the satellite has a beacon transmitter operating in the same frequency band as the communication carrier's downlink from the satellite. The beacon signal is transmitted with a stable signal level from the satellite itself and is only subject to downlink effects and gateway receiver errors. By comparing the looped back communication signal level with the beacon signal level, downlink effects is canceled and the control signal comprises only the desired components.

The beacon signal is received at the gateway with the following variations in signal level:

$$\Delta Beac_{Gw} = \Delta Dwn_{Gw} + \Delta Rx_{Gw}$$

where $\Delta Rx_{Gw}$ is the gateway receiver chain variations.

The looped back pilot signal is received at the gateway with the following variations in signal level:

$$\Delta Pil_{Gw} = \Delta TX_{Gw} + \Delta Up_{Gw} + \Delta Sat + \Delta Dwn_{Gw} + \Delta Rx_{Gw}$$

The difference used to control the transmitter gain becomes:

$$\Delta Gain_{Gw} = \Delta Dwn_{Gw} + \Delta Rx_{Gw} - (\Delta TX_{Gw} + \Delta Up_{Gw} + \Delta Sat + \Delta Dwn_{Gw} + \Delta Rx_{Gw})$$

This reduces to:

$$\Delta Gain_{Gw} = -(\Delta TX_{Gw} + \Delta Up_{Gw} + \Delta Sat)$$

The communication carriers at the output of the satellite are:

$$\Delta P_{Sat} = \Delta Gain_{Gw} + \Delta Tx_{Gw} + \Delta Up_{Gw} + \Delta Sat$$

Which becomes:

$$\Delta P_{Sat} = -(\Delta TX_{Gw} + \Delta Up_{Gw} + \Delta Sat) + \Delta Tx_{Gw} + \Delta Up_{Gw} + \Delta Sat = 0$$

This works well if the frequency difference between the beacon transmitter and the compensated communication carriers are not too large so that the atmospheric disturbances of the beacon signal are identical to the disturbances of the communication carriers.

DISCLOSURE OF THE INVENTION

Some systems do not have a satellite beacon transmitter with frequency sufficiently close to that of the communication carriers to be of any use for scintillation compensation. As an example, geostationary mobile satellite systems typically use L-band signals (1.5/1.6 GHz). Between the satellite and the mobile terminals while the feeder link between the satellites and the gateways are at C-band (6/4 GHz). The satellite beacon transmitter is around 4 GHz, which is not sufficiently close to the downlink L-band signals to be used directly for scintillation cancellation as shown above.

Therefore there is a need for another solution to this problem. The present invention takes advantage of the fact that in networks comprising several gateways with each gateway transmitting carriers to the satellite, simultaneous reception of these carriers by any of the gateways can be exploited to derive the local downlink atmospheric conditions at the gateway. This information can then in turn be used in an uplink power control system to make it immune to the downlink effects prevailing at the gateway similar to the use of a beacon transmitter as in the case above.

PREFERRED EMBODIMENT OF THE INVENTION

Figure 1:
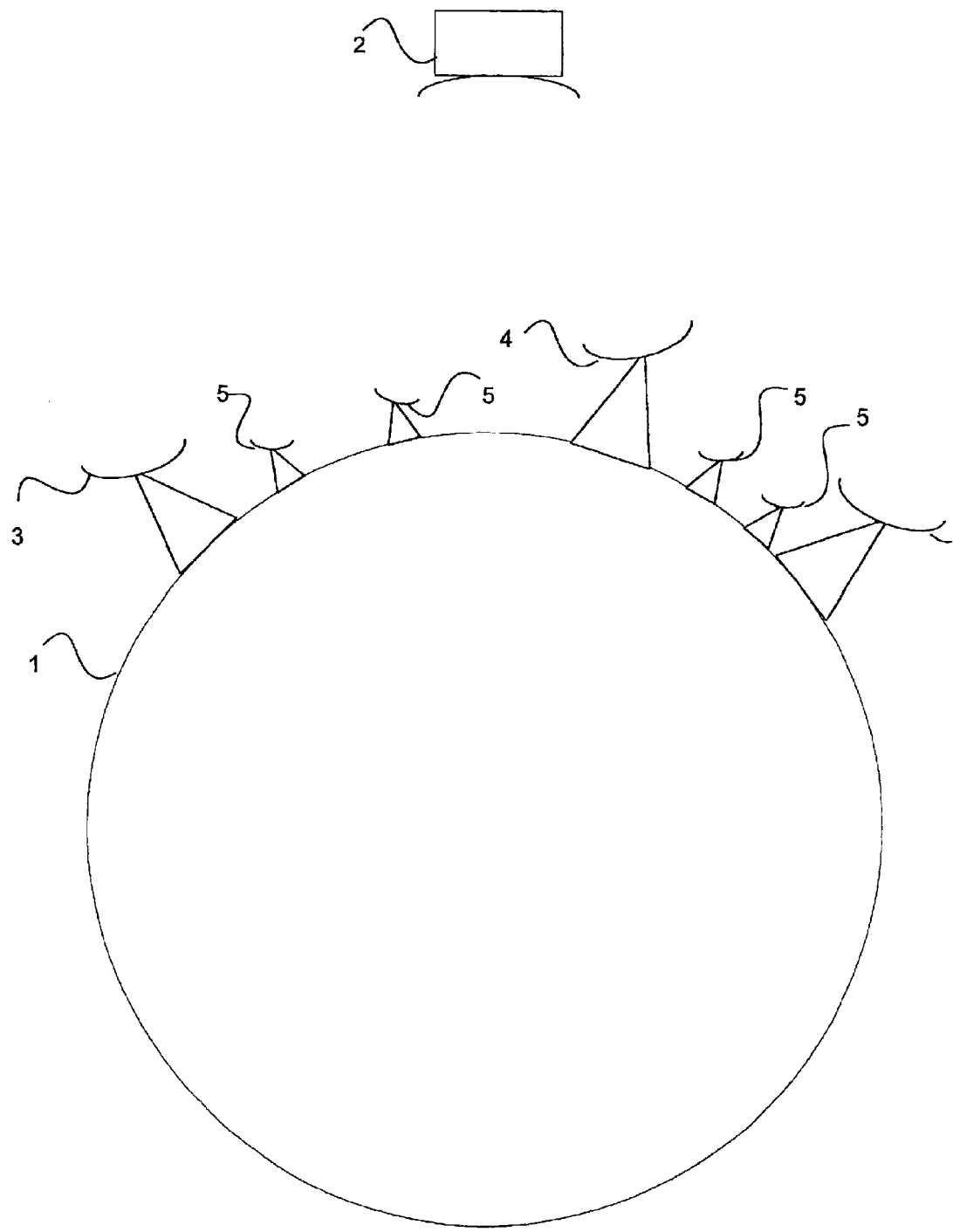
FIG. 1 shows a typical scenario comprising a geostationary satellite 2, a gateway 3 employing the invention, other gateways 4 operating on the same satellite 2, and a number of user stations 5 communicating with the gateway 3. The user stations 5 may be mobile or in a fixed location. The gateways 3 and 4 communicate with the user stations 5 via outbound signals through the satellite 2 and the user stations 5 communicate with the gateways 3 and 4 via inbound signals through the satellite 2.
Figure 2A:
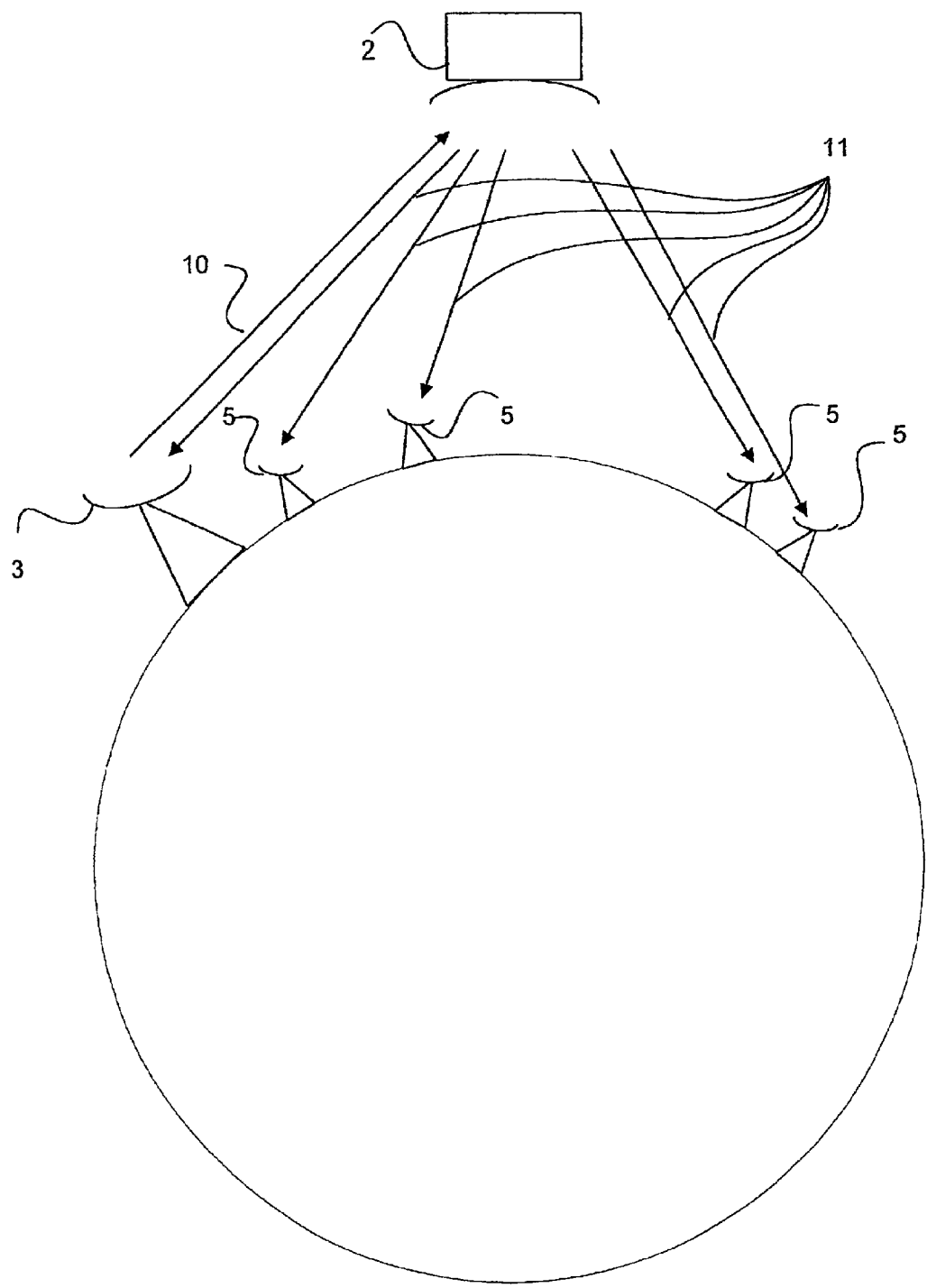
FIG. 2A illustrates the outbound signals 10 transmitted by one of the gateways 3 to the satellite, which in turn retransmits the signals 11 down link to the user stations 5. The gateway also normally monitors its outbound signals 10 (signal 11).
Figure 2B:
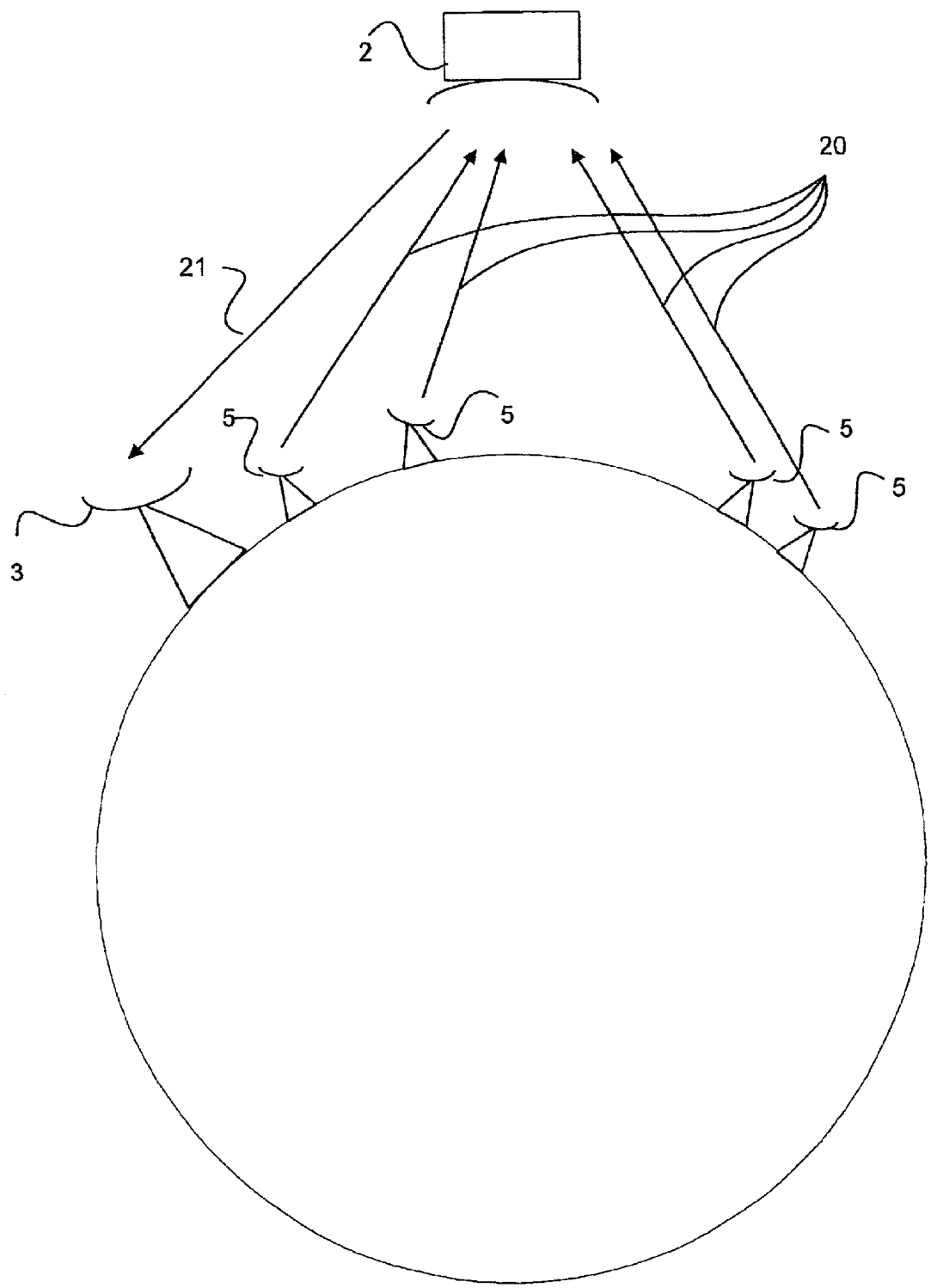
FIG. 2B illustrates the inbound signals 20 transmitted by the user stations to the satellite, which in turn retransmits the signals 21 down link to the gateway 3.
Figure 2C:
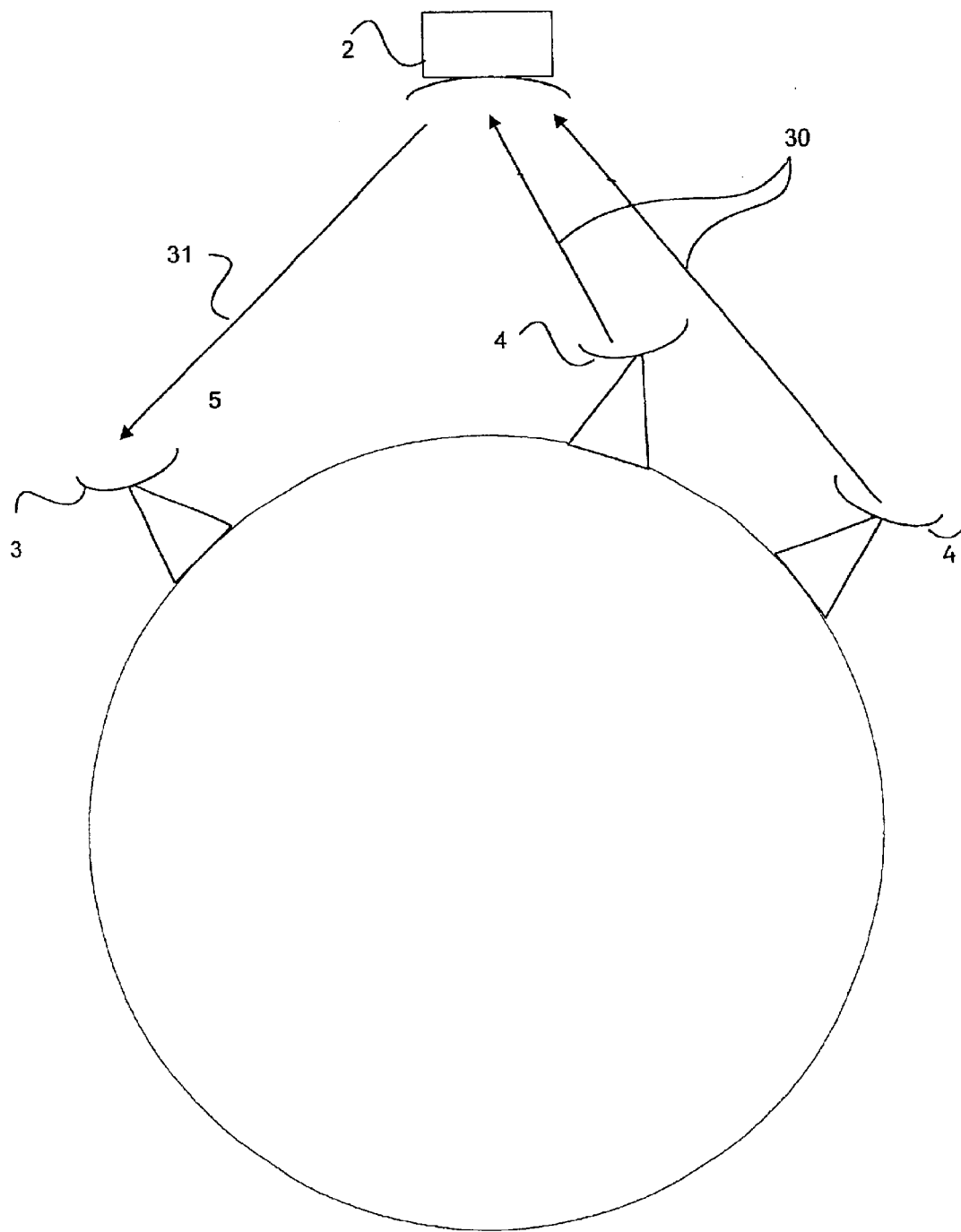
FIG. 2C illustrates the gateway 3 monitoring via signal 31 the outbound signals 30 transmitted by other gateways 4 operating over the satellite.
Figure 3:
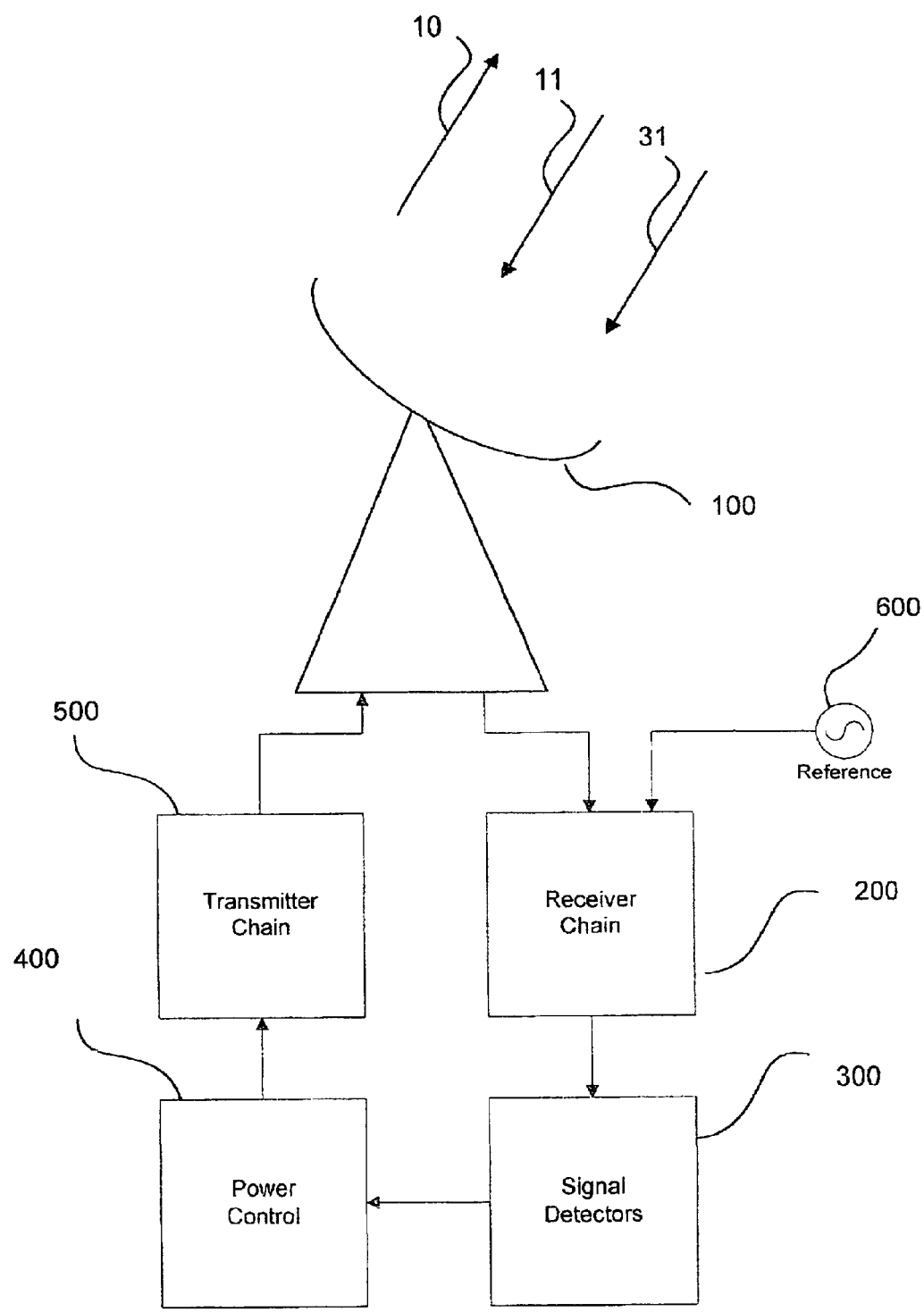
FIG. 3 illustrates the main components of the gateway station 3 employing power control 400 to its transmitted carriers 10. It comprises an antenna 100 receiving and emitting signals 10,11,31 to the satellite 2, a receiver chain 200, a transmitter chain 500, signal detectors 300, a power control function 400 and an optional reference signal generator 600.
Figure 4:
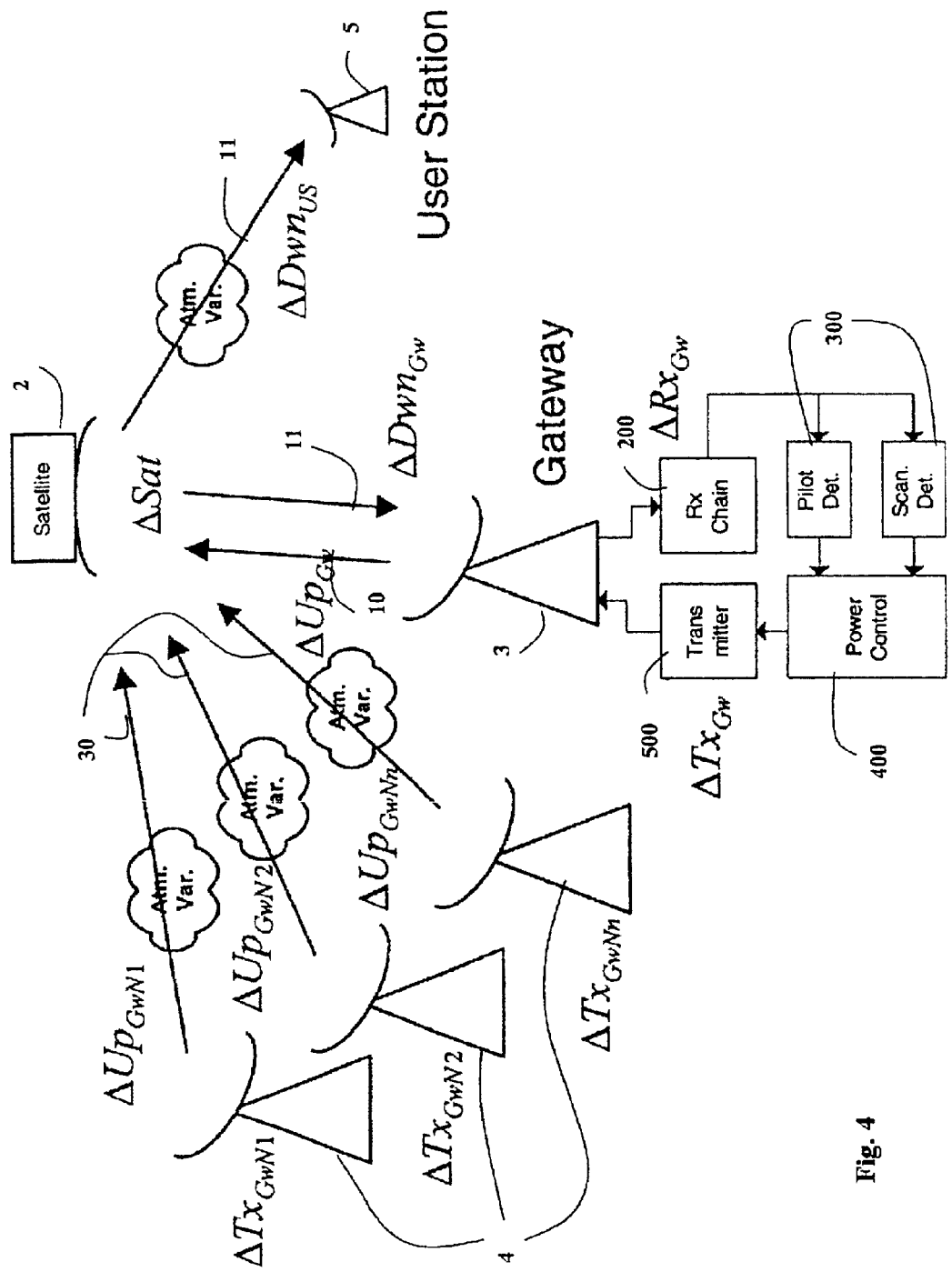
FIG. 4 illustrates a first exemplary embodiment of the invention. The TDM signals 30 are retransmitted by the satellite 2 and are monitored as the signals 31 by the gateway 3 that employs the invention. The receiver chain 200 detects the received pilot signal 11s power level and the scanner detector 300 finds the selected TDM signals 10s power levels the invention uses to determine the scintillation and to determine the necessary amount of adjustment of the power control 400 in the transmitting chain 500.
Figure 5:
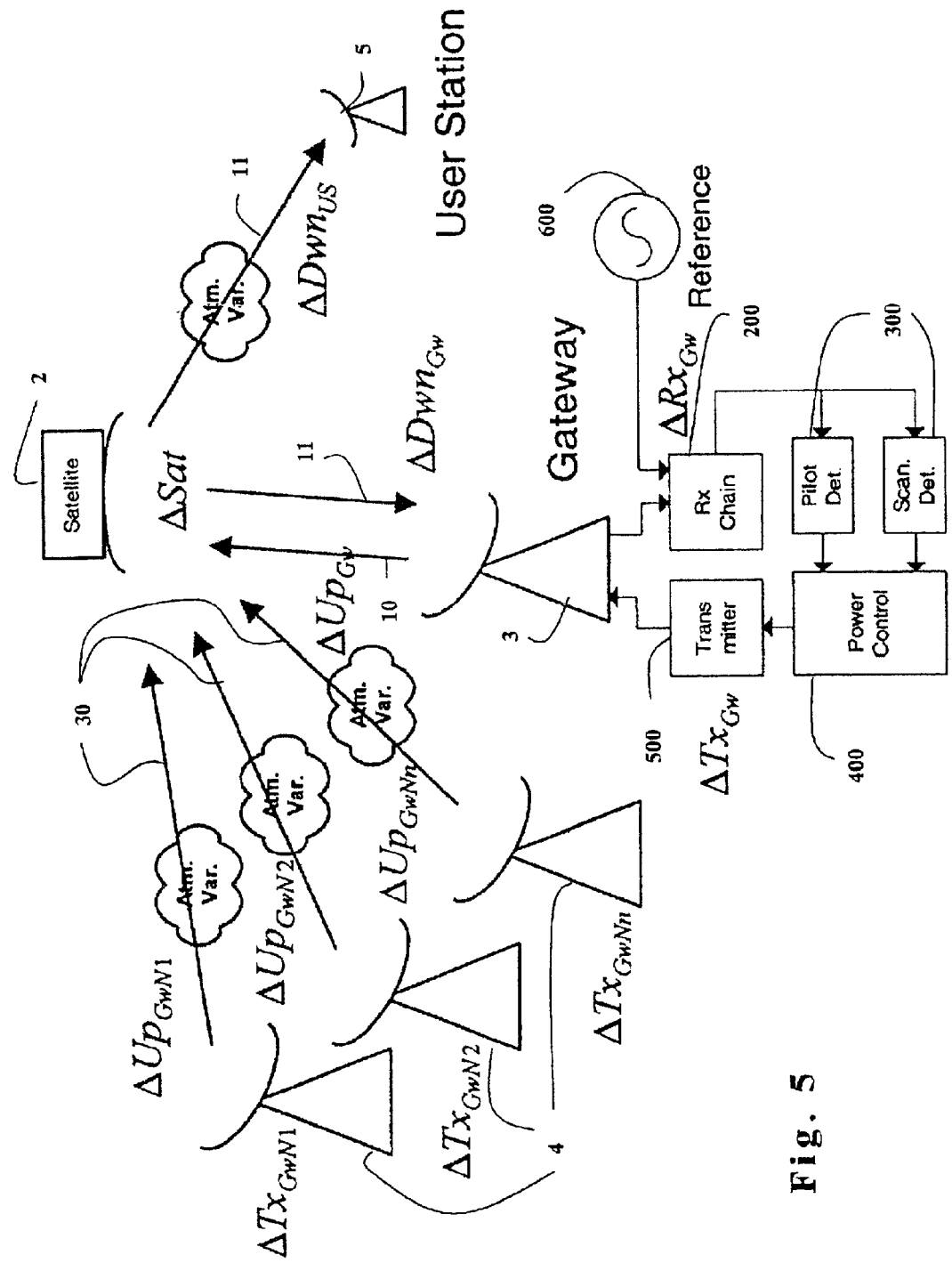
FIG. 5 illustrates a second embodiment of the invention, in addition to the functions depicted in FIG. 4, which also includes a reference signal 600 in the receiving chain 200 to eliminate variations in the satellite 2 gain.

In a preferred embodiment of the invention (FIG. 4) the system comprises a number of gateways (N1 to Nn) 4 each transmitting a communication carrier or a signaling carrier that is always on (e.g. a Time Division Multiplex carrier, TDM) 30.

The TDM 30 from Gateway N1 4 is received at the gateway 3 in the receiver chain 200 employing the invention with the following variations in signal level:

$$\Delta TDM_{GwN1} = \Delta TX_{GwN1} + \Delta Up_{GwN1} + \Delta Sat + \Delta Dwn_{Gw} + \Delta Rx_{Gw}$$

Similarly, the TDM from gateway Nn 4 is received with the following variations in signal level:

$$\Delta TDM_{GwNn} = \Delta TX_{GwNn} + \Delta Up_{GwNn} + \Delta Sat + \Delta Dwn_{Gw} + \Delta Rx_{Gw}$$

The gateways 4 are located remote to each other such that the atmospheric conditions can be assumed to be independent of each other. Likewise, the transmitter variations are also independent. By averaging over a number signal levels of carriers 30 and applying suitable signal processing as known to a person skilled in the art, the independent terms can be significantly reduced to an insignificant noise term. The resultant mean value after this process can be expressed as:

$$\Delta TDM_{Mean} = N + \Delta Sat + \Delta Dwn_{Gw} + \Delta Rx_{Gw}$$

where N denotes the residual noise after the averaging process. The measurement of each signal level of carrier 30 can be effected by either a set of receivers 200, one for each TDM 30 signal, a scanning receiver 300 capable of measuring each signal level of carrier 30 in rapid succession or a combination of the two. The scanning receiver 300 and the averaging process must be rapid to accurately track the atmospheric variations during scintillation events, the actual rate depending on the carrier frequencies involved.

The looped back pilot signal 11 is received at the gateway 3 with the following variations in signal level:

$$\Delta Pil_{Gw} = \Delta TX_{Gw} + \Delta Up_{Gw} + \Delta Sat + \Delta Dwn_{Gw} + \Delta Rx_{Gw}$$

The difference, used to control the transmitter 500 gain, becomes:

$$\Delta Gain_{Gw} = N + \Delta Sat + \Delta Dwn_{Gw} + \Delta Rx_{Gw} - (\Delta TX_{Gw} + \Delta Up_{Gw} + \Delta Sat + \Delta Dwn_{Gw} + \Delta Rx_{Gw})$$

This reduces to:

$$\Delta Gain_{Gw} = N - (\Delta TX_{Gw} + \Delta Up_{Gw})$$

The signal level variations of the communication carriers at the output of the satellite 2 are:

$$\Delta P_{Sat} = \Delta Gain_{Gw} + \Delta TX_{Gw} + \Delta Up_{Gw} + \Delta Sat$$

Which becomes:

$$\Delta P_{Sat} = N - (\Delta TX_{Gw} + \Delta Up_{Gw}) + \Delta TX_{Gw} + \Delta Up_{Gw} + \Delta Sat$$

Which reduces to:

$$\Delta P_{Sat} = N - \Delta Sat$$

The atmospheric variations and the gateway 3 signal level variations have been eliminated and the residual error is only the satellite signal level variations and a small noise term.

Figure 6:
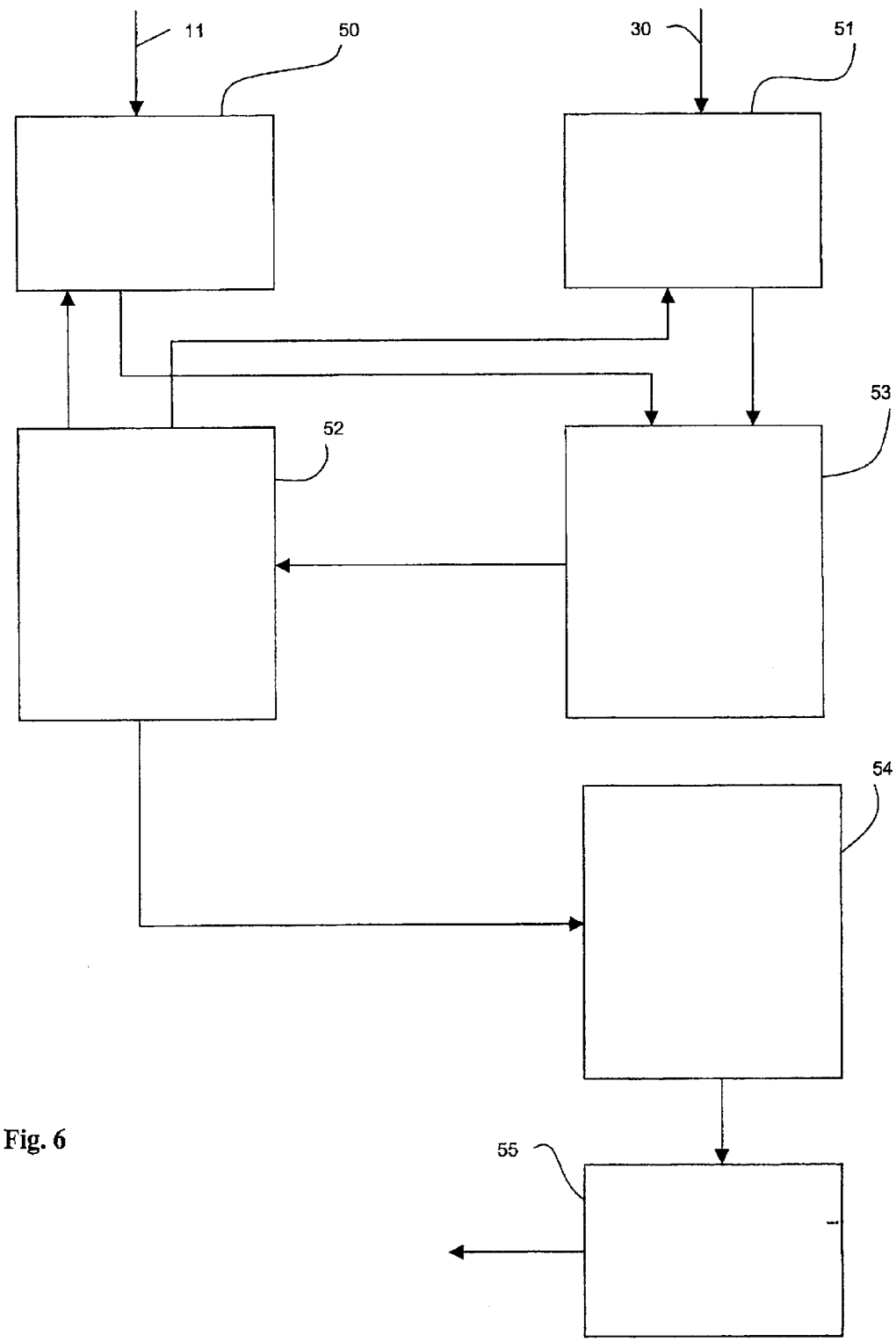
FIG. 6 illustrates a best mode implementation of the invention. The receiving means 100 containing the necessary electronics for signal conditioning and tuning of the signal can be adjusted by control sequences from the micro controller 200 to receive the different TDM signals 30 or pilot signal 11 or the reference signal 600. The Analog to Digital Converter 53 converts the received signals 30 to digital form for processing by control sequences in the micro controller 52 performing the steps of the invention. The Digital to Analog Converter 54 converts the digital UPC control signal to analog form suitable for connecting to a standard ARC input control signal of a standard power amplifier via the output means 55 containing the necessary electronics for interfacing the signal to the ARC input of the power control 400 of the transmitter chain 500.

An other embodiment of the invention illustrated in FIG. 6, a reference generator 600 is added to the receiving subsystem 200 of the gateway 3 to enable real time measurement of gain changes in the receiver chain 200.

As in the first exemplary embodiment of the invention the averaging process and measurements of the signal levels of the TDM signals 30 from the different gateways 4 will produce an average variation level signal:

$$\Delta TDM_{Mean} = N + \Delta Sat + \Delta Dwn_{Gw} + \Delta Rx_{Gw}$$

The average value is subjected to a high-pass filter with a cut-off that removes the slow satellite 2 variations from the estimate, but to pass the rapid scintillations. This also removes the slow gain variations of the gateway receiver system 200 resulting in the following variations of the level signal:

$$\Delta TDM'_{Mean} = N + \Delta Dwn_{Gw}$$

The high-pass filter is applied on each received signal level of the TDM 30 signal before averaging the signal levels.

The filter can be implemented in the form:

$$TMP_t = K_1 * P + (1-K_1) * TMP_{t-1}$$

$$P'_t = P - TMP_t$$

where $TMP_t$ is a temporary variable at a current time t, $K_1$ is a coefficient set to be between 0 and 1, P is the current measured power of TDM 30 the receiving chain 200 is tuned to at time t, $TMP_{t-1}$ is the previous sample value of the temporary variable TMP and $P'_t$ is the desired high-pass filter value of TDM 30 signal power level.

The measured value of the level of the reference signal injected at the input of the receiving system 200 is:

$$\Delta Re_{Gw} = \Delta Rx_{Gw}$$

This value is added to the TDM estimate to give the following value:

$$\Delta TDM'_{Mean} = N + \Delta Dwn_{Gw} + \Delta Rx_{Gw}$$

The looped back pilot signal 11 is received at the gateway 3 with the following variations in signal level:

$$\Delta Pil_{Gw} = \Delta TX_{Gw} + \Delta Up_{Gw} + \Delta Sat + \Delta Dwn_{Gw} + \Delta Rx_{Gw}$$

The difference, used to control the transmitter 500 gain, becomes:

$$\Delta Gain_{Gw} = N + \Delta Dwn_{Gw} + \Delta Rx_{Gw} - (\Delta TX_{Gw} + \Delta Up_{Gw} + \Delta Sat + \Delta Dwn_{Gw} + \Delta Rx_{Gw})$$

This reduces to:

$$\Delta Gain_{Gw} = N - (\Delta TX_{Gw} + \Delta Sat + \Delta Up_{Gw})$$

The level of the variations of the communication carrier signals at the output of the satellite 2 is:

$$\Delta P_{Sat} = \Delta Gain_{Gw} + \Delta TX_{Gw} + \Delta Up_{Gw} + \Delta Sat$$

Which becomes:

$$\Delta P_{Sat} = N - (\Delta TX_{Gw} + \Delta Sat + \Delta Up_{Gw}) + \Delta TX_{Gw} + \Delta Up_{Gw} + \Delta Sat$$

Which reduces to:

$$\Delta P_{Sat} = N$$

Which is only a small noise term.

In the disclosure of the two exemplary embodiments of the invention the noise term is small. But in order to reduce the noise term further the following steps can be applied to the multi TDM estimate calculations:

1. If the power level of the TDM 30 from a gateway 4 falls below a predefined threshold (Thr1), its measured value of power level is replaced by a constant value in the averaging process to limit the effect of a faulty gateway 4 on the performance.
2. If the instantaneous value of any particular power level of a TDM 30 signal deviates from the instantaneous average value of all the power levels of the TDMs (30) by more than a second predefined value (Thr2), it will be replaced by a constant value in the averaging process. This reduces substantially the effects that a local uplink scintillation event at a gateway 4 can have on the power regulation.
3. If the absolute value of the level difference between the current average value of all TDMs (30) and the average one processing sample earlier is below a third threshold (Thr3), the average is filtered by a low-pass filter with a suitable bandwidth. If Thr3 is exceeded, i.e. a scintillation event is detected at the gateway 3, the bandwidth of the filter is increased to enable a fast tracking mode to accurately track and suppress the scintillation as long as the condition is satisfied.

The low-pass filter in step 3 above can be of the form:

$$D'_t = K_2 * D + (1-K_2) * D'_{t-1}$$

where $D'_t$ is the filter output at the current sample time t, $K_2$ is a parameter that can be set to one of two different values between 0 and 1 depending on the absolute rate of change of the third difference being above or below the predefined threshold Thr3, and thereby enable fast tracking mode, D is the prevailing third difference and $D'_{t-1}$ is the previous sample filter output.

There are several possible implementation of the invention in an existing gateway 3 earth station. The normal gateway 3 station instrumentation includes an UPC controller, which usually is a power amplifier with an ARC (Automatic Gain Control) control signal input and an electronic attenuator as known to a person skilled in the art. The UPC controller is usually controlled by the pilot signal feedback loop 11. The power amplifier can be selected to be in a closed loop or open loop configuration.

Figure 7:
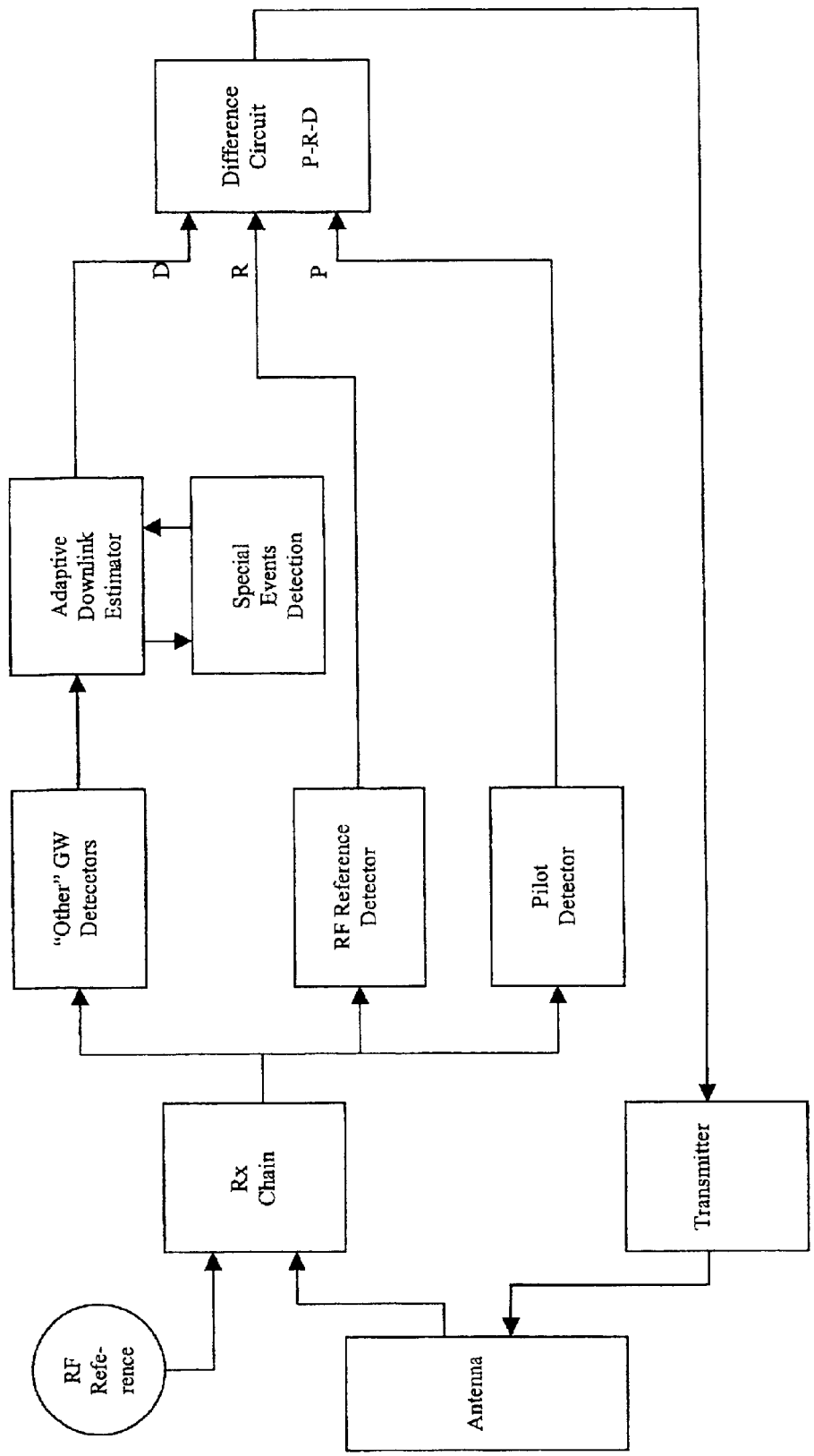
FIG. 7 illustrates the typical components of power control system.

Yet an other embodiment is shown in FIG. 7. The steps of an algorithm of a basic estimator of downlink variations using adaptive weights to the beacon signals determined by their current individual behavior are shown as functional blocks:

Block 101: High-pass Filter Signal Levels

The inputs are the signals from the "other" Gateway detectors.

Each detected Gateway signal level is passed through an individual high-pass filter. It takes the form of subtracting a low-pass filtered version of the signal from the signal itself. The output represents the instantaneous change in level with respect to a longer-term mean value.

Block 102: Compute Instantaneous Variance

This block takes as input the signals output from block 101.

It computes the difference between the change in each of the signals and the mean of the changes of the other signals. It then computes the absolute value of said difference.

Block 103: Low-pass Filter Variance.

This block takes as input the signals output from block 102.

It produces a low-pass filtered version of the variance. The output of the filters is estimates of the current variance of each carrier with respect to the average of the other carriers.

Block 104: Compute Relative Weights

This block takes as input the signals output from block 103.

It computes a weight for each signal such that when multiplied by the weight, they each contribute the same variance. I.e. the relative weights are the inverse of the variance.

Block 105: Normalize Weights

This block takes as input the signals output from block 104.

It normalizes the weights such that the sum of the weights is 1 while maintaining the relative ratio. I.e. the normalized weight is equal to the relative weight divided by the sum of the relative weights.

Block 106: Compute Downlink Estimate

This block takes as input the signals output from block 101 and block 104.

It computes a downlink estimate by first multiplying the level changes output from block 1 with the associated normalized weights output from block 2. The resulting is products are then summed to form the instantaneous downlink estimate.

Block 107: Low-pass Filter Estimate

This block takes as input the signals output from block 106.

It produces a low-pass filtered version of the downlink estimate. The time constant is optimized (a few seconds or less) to the characteristics of the scintillation.

Figure 8:
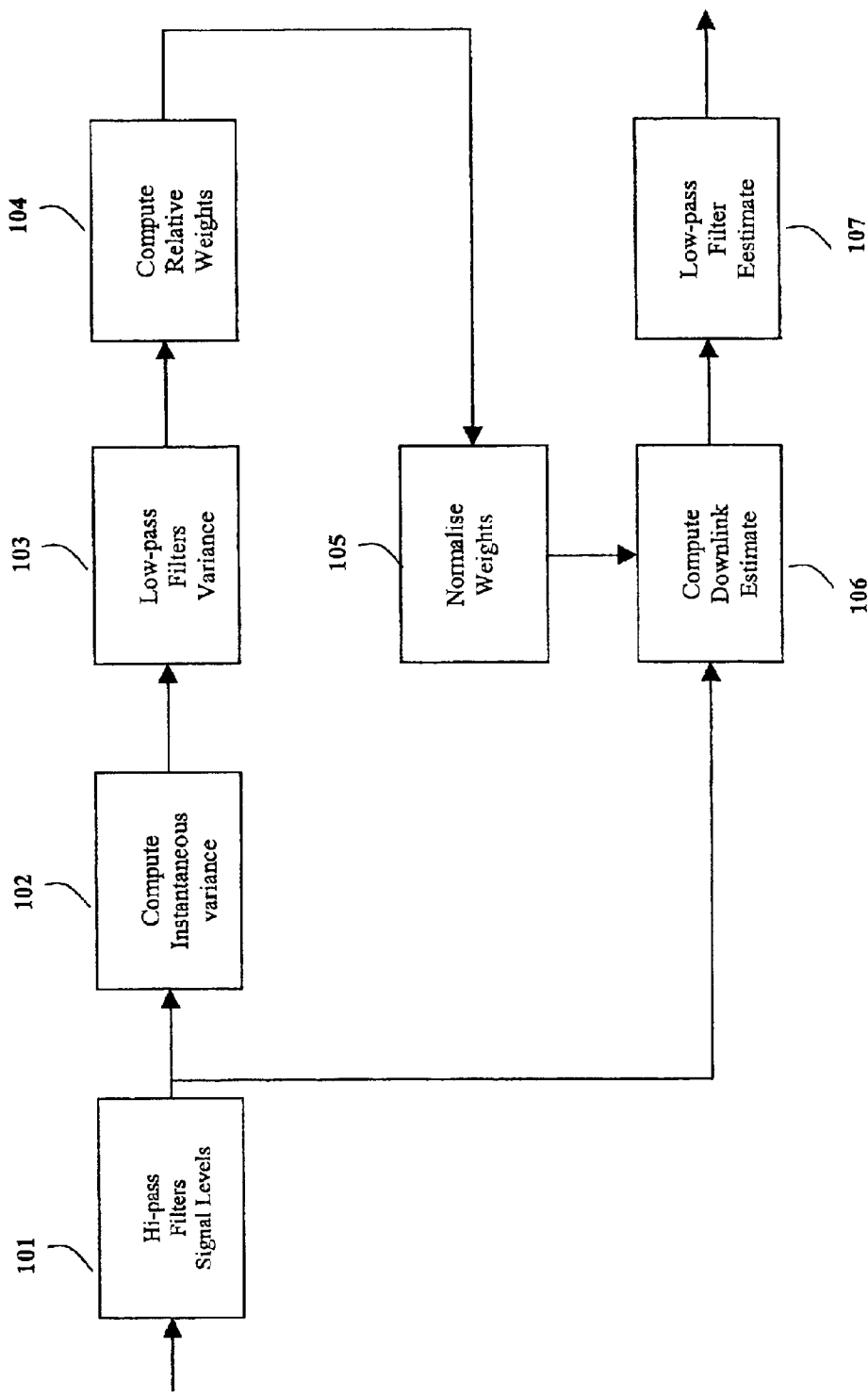
FIG. 8 illustrates the basic steps in the algorithm for an adaptive downlink estimator according to the invention.
Figure 9:
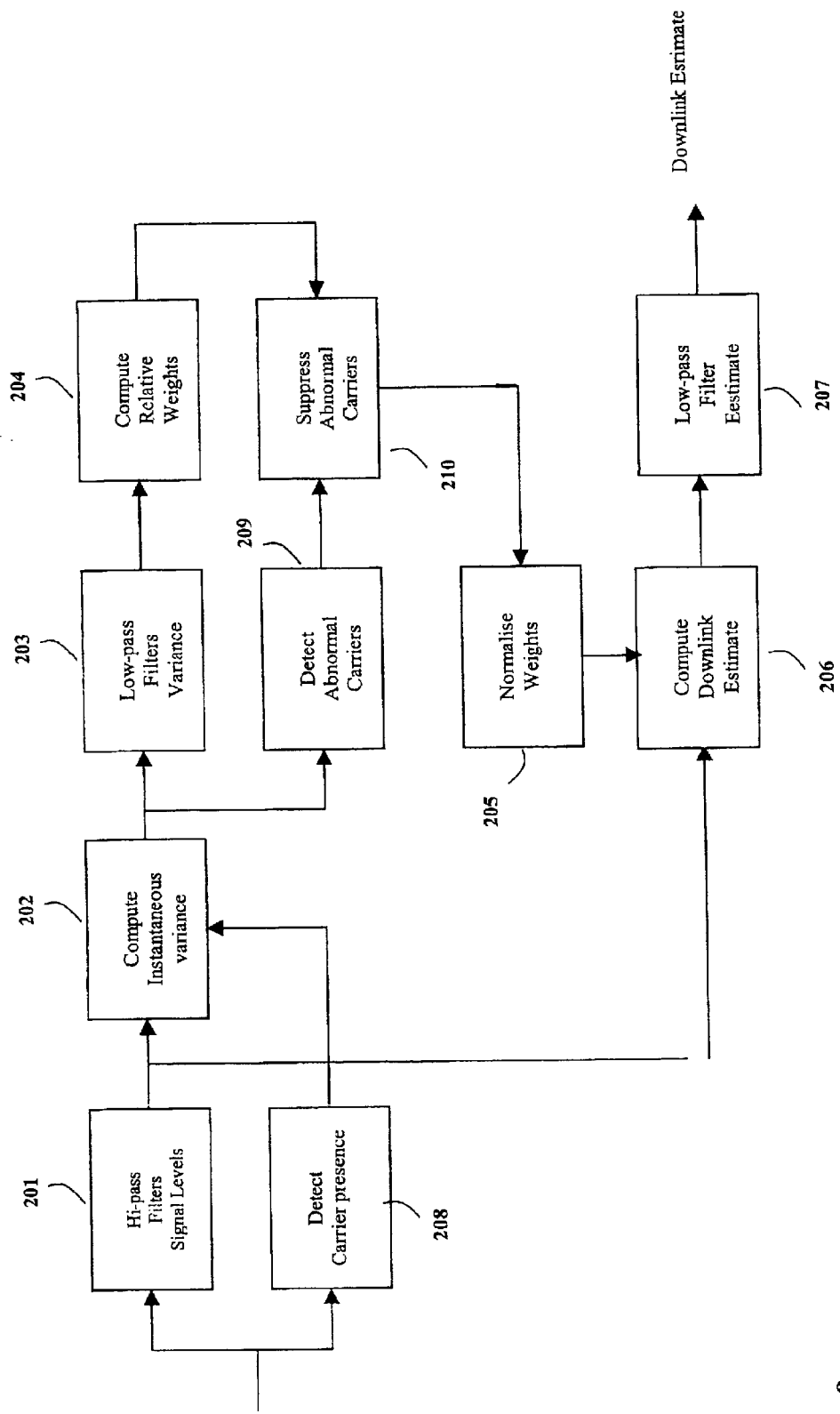
FIG. 9 illustrates the basic steps in the algorithm for an enhanced adaptive downlink estimator.

The best mode embodiment of the invention include the basic estimator as shown in FIG. 9 which is an enhanced version of the estimator shown in FIG. 8. The steps of the enhanced estimator are shown as blocks in FIG. 9. The steps are the same as in FIG. 8 except that the block 208, 209 and 210 has been augmented to the steps. These blocks detect anomalies in the beacon signals and take immediate action to prevent errors to be induced in the control loop.

Block 201: High-pass Filter Signal Levels

The inputs are the signals from the "other" Gateway detectors.

Each detected Gateway signal level is passed through an individual high-pass filter. It takes the form of subtracting a low-pass filtered version of the signal from the signal itself. The output represents the instantaneous change in level with respect to a longer-term mean value.

Block 208: Detect Carrier Presence

The inputs are the signals from the "other" Gateway detectors.

Each detected Gateway signal level is compared to a pre-set threshold. If the level is above the threshold a qualifier associated with the signal is set to one, otherwise it is set to zero.

Block 202: Compute Instantaneous Variance

This block takes as input the signals output from block 201 and the qualifiers from block 208. Only signals with qualifiers equal to one are processed.

It computes the difference between the change in each of the qualified signals and the mean of the changes of the other qualified signals. It then computes the absolute value of said difference, which is the output of the block Block 201: Low-pass Filter Variance This block takes as input the signals output from block 202.

It produces a low-pass filtered version of the variance. The outputs of the filters are estimates of the current variance of each carrier with respect to the average of the other carriers.

Block 204: Compute Relative Weights

This block takes as input the signals output from block 203.

It computes a weight for each signal such that when multiplied by the weight, they each contribute the same variance. I.e. the relative weights are the inverse of the variance.

Block 209: Detect Abnormal Carriers

This block takes as input the signals output from block 202.

The instantaneous variance of each signal is compared to a pre-set threshold. If the variance of level is less than the threshold a second qualifier associated with the signal is set to one, if it is greater it is set to zero.

Block 210: Suppress Abnormal Carriers

This block takes as input the signals output from block 204 and the second qualifiers from block 209. Signals with second qualifiers equal to one are passed to the output; signals with second qualifiers equal to zero are blocked from further processing.

Block 205: Normalize Weights

This block takes as input the signals output from block 210.

It normalizes the weights such that the sum of the weights is 1 while maintaining the relative ratio. I.e. the normalized weight is equal to the relative weight divided by the sum of the relative weights.

Block 206: Compute Downlink Estimate

This block takes as input the signals output from block 201 and block 204.

It computes a downlink estimate by first multiplying the level changes output from block 201 with the associated normalized weights output from block 202. The resulting products are then summed to form the instantaneous downlink estimate.

Block 207: Low-pass Filter Estimate

This block takes as input the signals output from block 206.

It produces a low-pass filtered version of the downlink estimate. The time constant is optimized (a few seconds or less) to the characteristics of the scintillation.

The best mode embodiment of the present invention is to replace the usual use and configuration of the pilot signal 11 with a configuration including a "Multi channel Scintillation and Fading Processing Receiver". This box will together with the traditional UPC equipment perform the preferred steps of the embodiment as described in the exemplary embodiments above.

The Multi channel Scintillation and Fading Processing Receiver as shown in FIG. 6 comprises carrier signal inputs 11, 30 with their respective receivers 50,51. The Analog to Digital Converter circuit 53 converts the signal levels of the carrier signals 30 and the level of the pilot signal 11 to binary form suitable for processing by the micro controller 52. The micro program running in the micro controller 52 performs the necessary steps of the invention as described above in the exemplary embodiments of the invention. The output of the micro program is fed through the Digital to Analog converter 54 to the ARC input of the UPC power amplifier via the output means 55. The micro program reads first the signal level of the pilot signal 11 then the signal levels of the 5 TDM signals 30 and then the RF reference signal 600 level. The best way to implement the small multitasking real time program system in the micro controller 52 is to let the program measure the pilot signal 11 continuously for about 100 ms to obtain continuously regulation of the power. It is desirable to measure the RF reference signal 600 with the same receiver 50,51 and for the same amount of time.

The 5 gateways 4 chosen to be part of the scheme should be selected on basis of a statistical analysis based on received signal quality from a selection of possible stations 4 over a period of minimum 1 month. The 5 stations 4 with the best signal quality should be used in the scheme to guaranty the best scintillation free UPC regulation. The RF reference signal 600 is injected in the RF signal path by a directive RF coupler that gets its signal from a standard signal generator.

One of the main benefits of the present invention is the symmetry in the preferred embodiment when the invention is applied on several gateways in the same communication system. If we also implement this invention in a gateway 4, regarding it as gateway 3 as described in the preferred embodiment, and uses the gateway 3 as gateway 4 both gateway 3 and 4 will regulate their outbound signal power levels and thereby increase the total signal quality by regulating the signals that are used to regulate the uplink power in the communication system.

What is claimed is:

1. Method for up-link power control in a first gateway earth station (3) in a satellite communication system comprising a geostationary satellite (2), a least two other geographically dispersed earth gateway stations (4) communicating signal carriers (30) via said satellite (2) and a plurality of user stations (5), comprising the steps of:

transmitting a first outbound signal (11) to said satellite from a first gateway (3);

receiving said first outbound signal (11) looped back from said satellite (2) in first said gateway (3) determining the said first outbound signal (11) power level;

wherein:

receiving signal carriers (30) from at least a second gateway station (4) and at least a third gateway station (4) in the same said communication system from said satellite (2) in the first said gateway station (3), determining the signal power level of a signal (30) from said second gateway (4) and the signal power level from a signal (30) from said third gateway (4);

replacing the signal power level of any received signal (30) from said second gateway (4) or from said third gateway (4) in said first gateway (3) with a predefined nominal power value level if one of said signals (30) are below a first predefined threshold value for that said signal power level;

computing a mean value of the signal power level of the outbound signals (30) from said second gateway station (4) and said third gateway station (4) in said first gateway station (3);

computing a first difference between said first signal (11) power level of said first outbound signal (11) from first said gateway (3) and a nominal signal power level of an outbound signal looped back from said satellite (2) to first said gateway (3);

computing a second difference between said mean signal power level of said second signal (30) from said second gateway (4) and said third signal (30) from said third gateway (4) and a nominal mean power level of a signal from said second gateway (4) and a signal from said third gateway (4);

computing an error signal formed by the difference of the first said difference and the second said difference;

adjusting the power level of said first gateway stations (3) outbound signals an amount based on said error signal within the permissible range of said power level.

2. Method according to claim 1 wherein the step of:

filtering all said received signal levels of signals (30) in said first gateway (3) that are above said first predefined threshold value with a high-pass filter of the form:

$$TMP_t = K_1 * P + (1-K_1) * TMP_{t-1}$$

$$P'_t = P - TMP_t$$

where $TMP_t$ is a temporary variable at a current time t, $K_1$ is a coefficient set to be between 0 and 1, P is the current measured power of signal (11,30) the gateway (3) is receiving at time t, $TMP_{t-1}$ is the previous sample value of the temporary variable TMP and $P'_t$ is the desired high-pass filter value of said signal power level (30).

3. Method according to claim 2 wherein the step of:

replacing the output of the said high-pass filter with zero if said received level of signal (30) is below said first threshold value.

4. Method according to claim 1 wherein the step of:

replacing the current received signal power level (30) with a constant nominal value in the averaging process if the received signal power level (30) deviates from the current average signal power level of said second received power level signal (30) and said third power level signal (30) with more than a second predefined threshold value.

5. Method according to claim 1 wherein the step of:

low-pass filtering the mean value of the signal level of said second signal (30) from said second gateway (4) and the signal level of said third signal (30) from the said third gateway (4) with a low-pass filter of the form:

$$D'_t = K_2 * D + (1-K_2) * D'_{t-1}$$

if a third difference between said current mean value and the said mean value of one processing step earlier is below a third threshold value; and where $D'_t$ is the filter output at the current sample time t; $K_2$ is a parameter set to a first value of two different values between 0 and 1 depending on the absolute rate of change of the third difference being above or below the said predefined third threshold value; D is the prevailing said third difference and $D'_{t-1}$ is the mean value of one processing step earlier.

6. Method according to claim 5 wherein the step of:

replacing said parameter $K_2$ with a second value between 0 and 1 if said mean value exceeds said third threshold value to enable tracking of scintillations.

7. Method according to claim 1, further comprising the steps of:

computing a fourth difference between an injected reference signal level and said signals nominal value of the signal level; and computing an error signal formed by the difference between said low-pass filtered signals said third difference and said fourth difference; and adjusting the power level of said first gateway stations (3) outbound signals an amount based on said error signal within the permissible range of said power level.

8. Device for up-link power control in a first gateway earth station (3) in a satellite communication system comprising a geostationary satellite (2), a least two other geographically dispersed earth gateway stations (4) communicating signal carriers (30) via said satellite (2) and a plurality of user stations (5), comprising:

means for transmitting a first outbound signal (11) to said satellite from a first gateway (3);

means for receiving said first outbound signal (11) looped back from said satellite (2) in first said gateway (3) determining the said first outbound signal (11) power level;

comprising:

means for receiving signal carriers (30) from at least a second gateway station (4) and at least a third gateway station (4) in the same said communication system from said satellite (2) in the first said gateway station (3), determining the signal power level of a signal (30) from said second gateway (4) and the signal power level from a signal (30) from said third gateway (4);

means for replacing the signal power level of any received signal (30) from said second gateway (4) or from said third gateway (4) in said first gateway (3) with a predefined nominal power value level if one of said signals (30) are below a first predefined threshold value for that said signal power level.

means for computing a mean value of the signal power level of the outbound signals (30) from said second gateway station (4) and said third gateway station (4) in said first gateway station (3);

means for computing a first difference between said first signal (11) power level of said first outbound signal (11) from first said gateway (3) and a nominal signal power level of an outbound signal looped back from said satellite (2) to first said gateway (3); the said nominal value is determined on a day with a clear sky;

means for computing a second difference between said mean signal power level of said second signal (30) from said second gateway (4) and said third signal (30) from said third gateway (4) and a nominal mean power level of a signal from said second gateway (4) and a signal from said third gateway (4); the nominal value is determined on a day with a clear sky;

means for computing an error signal formed by the difference of the first said difference and the second said difference;

means for adjusting the power level of said first gateway stations (3) outbound signals an amount based on said error signal within the permissible range of said power level.

9. Device according to claim 8 comprising:

means for filtering all said received signal levels of signals (30) in said first gateway (3) that are above said first predefined threshold value with a high-pass filter of the form:

$$TMP_t = K_1 * P + (1-K_1) * TMP_{t-1}$$

$$P'_t = P - TMP_t$$

where $TMP_t$ is a temporary variable at a current time t, $K_1$ is a coefficient set to be between 0 and 1, P is the current measured power of signal (11,30) the gateway (3) is receiving at time t, $TMP_{t-1}$ is the previous sample value of the temporary variable TMP and $P'_t$ is the desired high-pass filter value of said signal power level (30).

10. Device according to claim 9 further comprising:

means for replacing the output of the said high-pass filter with zero if said received level of signal (30) is below said first threshold value.

11. Device according to claim 8 comprising:

means for replacing the current received signal power level (30) with a constant nominal value in the averaging process if the received signal power level (30) deviates from the current average signal power level of said second received power level signal (30) and said third power level signal (30) with more than a second predefined threshold value.

12. Device according to claim 8 comprising:

means for low-pass filtering the mean value of the signal level of said second signal (30) from said second gateway (4) and the signal level of said third signal (30) from the said third gateway (4) with a low-pass filter of the form:

$$D'_t = K_2 * D + (1-K_2) * D'_{t-1}$$

if a third difference between said current mean value and the said mean value of one processing step earlier is below a third threshold value; and where $D'_t$ is the filter output at the current sample time t; $K_2$ is a parameter set to a first value of two different values between 0 and 1 depending on the absolute rate of change of the third difference being above or below the said predefined third threshold value; D is the prevailing said third difference and $D'_{t-1}$ is the mean value of one processing step earlier.

13. Device according to claim 11 further comprising:

means for replacing said parameter $K_2$ with a second value between 0 and 1 if said mean value exceeds said third threshold value to enable tracking of scintillations.

14. Device according to claim 8, further comprising:

means for computing a fourth difference between an injected reference signal level and said signals nominal value of the signal level; and means for computing an error signal formed by the difference between said low-pass filtered signals said third difference and said fourth difference; and means for adjusting the power level of said first gateway stations (3) outbound signals an amount based on said error signal within the permissible range of said power level.

15. Method for up-link power control in a first gateway earth station (3) in a satellite communication system comprising a geostationary satellite (2), a least two other geographically dispersed earth gateway stations (4) communicating signal carriers (30) via said satellite (2) and a plurality of user stations (5), comprising the steps of:

transmitting a first outbound signal (11) to said satellite from a first gateway (3);

receiving said first outbound signal (11) looped back from said satellite (2) in first said gateway (3) determining the said first outbound signal (11) power level;

wherein:

receiving signal carriers (30) from at least a second gateway station (4) and at least a third gateway station (4) in the same said communication system from said satellite (2) in the first said gateway station (3), filtering any received signal in an individual high pass filter of the form of subtracting a low pass filtered version of the signal from the signal itself producing an instantaneous change level signal;

compute an absolute change level signal by subtracting the said instantaneous change level signal from a mean of changes from other signals thereby producing a low pass filtered current variance signal;

compute a weight for each signal by taking the inverse of said variance such that when multiplied by the weight, each signal contributes the same variance;

compute a normalized weight for each said signals such that the sum of said normalized weights equal 1;

compute a downlink estimate by first multiplying said instantaneous change level signal with the associated normalized weight and sum all said products to form an instantaneous downlink estimate;

compute an error signal formed as a difference between said instantaneous downlink estimate and a received beacon signal and a RF reference signal;

adjusting the power level of sa first gateway stations (3) outbound signals an amount based on said error signal within the permissible range of said power level.

16. Device for up-link power control in a first gateway earth station (3) in a satellite communication system comprising a geostationary satellite (2), a least two other geographically dispersed earth gateway stations (4) communicating signal carriers (30) via said satellite (2) and a plurality of user stations (5), comprising:

mans for transmitting a first outbound signal (11) to said satellite from a first gateway (3);

means for receiving said first outbound signal (11) looped back from said satellite (2) in first said gateway (3) determining the said first outbound signal (11) power level;

comprising:

means for receiving signal carriers (30) from at least a second gateway station (4) and at least a third gateway station (4) in the same said communication system from said satellite (2) in the first said gateway station (3), filtering any received signal in an individual high pass filter of the form of subtracting a low pass filtered version of the signal from the signal itself producing an instantaneous change level signal;

means for computing a change level signal by subtracting the said instantaneous change level signal from a mean of changes from other signals thereby producing a low pass filtered current variance signal;

means for computing a weight for each signal by taking the inverse of said variance such that when multiplied by the weight, each signal contribute the same variance;

means for computing a normalized weight for each said signals such that the sum of said normalized weights equal 1;

means for computing a downlink estimate by first multiplying said instantaneous change level signal with the associated normalized weight and sum all said products to form an instantaneous downlink estimate;

means for computing an error signal formed as a difference between said instantaneous downlink estimate and a received beacon signal and a RF reference signal;

means for adjusting the power level of said first gateway stations (3) outbound signals an amount based on said error signal within the permissible range of said power level.

* * * * *